United States Patent
Kang et al.

(10) Patent No.: US 10,862,126 B2
(45) Date of Patent: Dec. 8, 2020

(54) BINDER COMPOSITION FOR SECONDARY BATTERY, AND ELECTRODE FOR SECONDARY BATTERY AND LITHIUM SECONDARY BATTERY COMPRISING THE SAME

(71) Applicant: LG Chem, Ltd., Seoul (KR)

(72) Inventors: Min Ah Kang, Daejeon (KR); Dong Jo Ryu, Daejeon (KR); Seon Hee Han, Daejeon (KR); Cheol Hoon Choi, Daejeon (KR); Hye Soo Han, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/761,600

(22) PCT Filed: Dec. 22, 2016

(86) PCT No.: PCT/KR2016/015132
§ 371 (c)(1),
(2) Date: Mar. 20, 2018

(87) PCT Pub. No.: WO2017/111514
PCT Pub. Date: Jun. 29, 2017

(65) Prior Publication Data
US 2018/0351177 A1 Dec. 6, 2018

(30) Foreign Application Priority Data

Dec. 24, 2015 (KR) .................. 10-2015-0186395
Dec. 22, 2016 (KR) .................. 10-2016-0176434

(51) Int. Cl.
| | | |
|---|---|---|
| *H01M 4/62* | (2006.01) | |
| *C08L 15/00* | (2006.01) | |
| *C08L 9/06* | (2006.01) | |
| *C08F 236/10* | (2006.01) | |
| *C08L 33/26* | (2006.01) | |
| *H01M 4/13* | (2010.01) | |
| *H01M 10/0525* | (2010.01) | |
| *C08F 220/18* | (2006.01) | |
| *H01M 10/052* | (2010.01) | |
| *C08C 19/36* | (2006.01) | |
| *C08F 236/06* | (2006.01) | |

(52) U.S. Cl.
CPC ............ *H01M 4/622* (2013.01); *C08C 19/36* (2013.01); *C08F 236/10* (2013.01); *C08L 9/06* (2013.01); *C08L 15/00* (2013.01); *C08L 33/26* (2013.01); *H01M 4/13* (2013.01); *H01M 10/052* (2013.01); *H01M 10/0525* (2013.01); *C08F 220/18* (2013.01); *C08F 236/06* (2013.01)

(58) Field of Classification Search
CPC combination set(s) only.
See application file for complete search history.

(56) References Cited

U.S. PATENT DOCUMENTS

| | | | |
|---|---|---|---|
| 10,164,259 B2* | 12/2018 | Mukai | H01M 4/136 |
| 2003/0113626 A1 | 6/2003 | Maeda et al. | |
| 2007/0202403 A1 | 8/2007 | Oh et al. | |
| 2013/0112928 A1* | 5/2013 | Omote | H01M 4/5825 252/511 |
| 2014/0077128 A1 | 3/2014 | Inoue | |
| 2014/0349185 A1 | 11/2014 | Momose et al. | |
| 2015/0010815 A1 | 1/2015 | Chung et al. | |
| 2015/0280237 A1 | 10/2015 | Mukai et al. | |
| 2016/0036055 A1 | 2/2016 | Yamamoto | |
| 2016/0233512 A1 | 8/2016 | Park et al. | |
| 2016/0344007 A1* | 11/2016 | Toyoda | H01M 2/1653 |
| 2016/0359156 A1* | 12/2016 | Ohkubo | C08F 220/18 |

FOREIGN PATENT DOCUMENTS

| | | | |
|---|---|---|---|
| CN | 103620837 A | 3/2014 | |
| CN | 104081567 A | 10/2014 | |
| CN | 105190967 A | 12/2015 | |
| GB | 2495951 A | 5/2013 | |
| JP | 2014531123 A | 11/2014 | |
| KR | 100582518 B1 | 5/2006 | |
| KR | 100790833 B1 | 1/2008 | |
| KR | 20140116190 A | 10/2014 | |
| KR | 20150006327 A | 1/2015 | |
| KR | 20150021004 A | 2/2015 | |
| KR | 20150068371 A | 6/2015 | |
| WO | 2014148064 A1 | 9/2014 | |
| WO | 2015026102 A1 | 2/2015 | |
| WO | WO-2015146787 A1 * | 10/2015 | H01G 11/28 |

OTHER PUBLICATIONS

Machine translation of WO 2015/146787 A1, retrieved Mar. 2020 (Year: 2020).*
Supplementary European Search Report and Written Opinion for EP Application No. 16879381.8, dated Sep. 17, 2018.
Search report from International Application No. PCT/KR2016/015132, dated Apr. 3, 2017.

* cited by examiner

*Primary Examiner* — Nicole M. Buie-Hatcher
(74) *Attorney, Agent, or Firm* — Lerner, David, Littenberg, Krumholz & Mentlik, LLP

(57) ABSTRACT

The present invention relates to a binder composition for a secondary battery, including: a copolymer having a functional group; and an alkali metal ion bound to the functional group of the copolymer or with which a constituent element of the functional group is substituted. The binder composition exhibits enhanced adhesive strength and also exhibits low resistance due to the alkali metal ion included in the copolymer, and thus may exhibit more stable electrochemical performance.

9 Claims, No Drawings

BINDER COMPOSITION FOR SECONDARY BATTERY, AND ELECTRODE FOR SECONDARY BATTERY AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2016/015132 filed Dec. 22, 2016, which claims priority from Korean Patent Application Nos. 10-2015-0186395, filed on Dec. 24, 2015, and 10-2016-0176434, filed on Dec. 22, 2016, the disclosures of which are incorporated herein by reference.

TECHNICAL FIELD

The present invention relates to a binder composition for a secondary battery, an electrode for a secondary battery and a lithium secondary battery comprising the same, and more particularly, to a binder composition for a secondary battery which comprises alkali metal ions and thus has high adhesion for electrode materials and low resistance, an electrode for a secondary battery which comprises the same, and a lithium secondary battery including the electrode.

BACKGROUND ART

In line with an increase in technology development of and demand for mobile devices, demand for secondary batteries as energy sources is rapidly increasing. Among these secondary batteries, lithium secondary batteries which have high energy density and operating voltage, a long cycle lifespan, and a low self-discharge rate are commercially available and widely used.

Electrodes of lithium secondary batteries are manufactured by: preparing a slurry by mixing a positive active material or a negative active material with a binder resin component and dispersing the resulting mixture in a solvent; coating a surface of an electrode current collector with the slurry; and drying the resulting electrode current collector, to form a mixture layer.

Binders are used to secure an adhesion or binding strength between active materials and between an active material and an electrode current collector, but an excess amount of binder is required to enhance adhesion between an electrode current collector and an active material. However, the excess amount of binder has problems in terms of reducing the capacity and conductivity of an electrode. In contrast, insufficient adhesion causes an electrode peeling phenomenon in processes of drying and pressing an electrode, which is a cause of a high electrode defect rate. In addition, an electrode with low adhesion may be separated by external impact, and such electrode peeling may increase contact resistance between an electrode material and a current collector, resulting in deterioration of electrode output performance.

In particular, during charging and discharging of a lithium secondary battery, a negative active material undergoes a volumetric change due to a reaction with lithium, and, when the charging and discharging processes continue, the negative active material is separated from a current collector, resistance is increased according to a change in the contact interface between active materials and, accordingly, as the cycle of charging and discharging proceeds, capacity of the battery rapidly deteriorates, resulting in a shortened cycle lifespan. In addition, when a material such as silicon, tin, a silicon-tin alloy, or the like is used in combination to increase discharge capacity, a much greater volumetric change is caused by a reaction of silicon, tin, or the like with lithium, and thus these problems more significantly occur.

Therefore, there is a continuous need to develop a binder capable of providing a secondary battery with enhanced performance and an electrode for a secondary battery which is manufactured using the same, by addressing electrochemical performance deterioration problems due to electrode peeling, separation of an active material from a current collector, or a change in the contact interface between active materials by imparting much higher adhesion.

DISCLOSURE

Technical Problem

The present invention provides a binder composition for a secondary battery which exhibits much higher adhesion and low resistance and thus may enhance the electrochemical performance of a battery including the same.

The present invention also provides an electrode for a secondary battery which comprises the above-described binder composition.

The present invention also provides a lithium secondary battery including the above-described electrode.

Technical Solution

According to an embodiment of the present invention, there is provided a binder composition for a secondary battery which provides much higher adhesion and exhibits low resistance, and thus may enhance battery electrochemical performance.

According to another embodiment of the present invention, there is provided an electrode for a secondary battery, including the above-described binder composition.

According to another embodiment of the present invention, there is provided a lithium secondary battery including the above-described electrode.

Advantageous Effects

A binder composition for a secondary battery, according to the present invention, comprises a binder including a copolymer including a certain amount of an alkali metal ion, and thus may exhibit enhanced adhesion due to the binder and low resistance imparted by the alkali metal ion included in the copolymer, whereby more stable electrochemical performance may be obtained, and may therefore be usefully used in the manufacture of a lithium secondary battery.

BEST MODE

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention in the best way.

A binder composition for a secondary battery, according to the present invention, comprises: a copolymer containing a functional group; and an alkali metal ion bound to the functional group of the copolymer or with which a constituent element of the functional group is substituted.

The copolymer comprises three or more selected from the group consisting of (a) a repeating unit derived from a conjugated diene-based monomer or a unit derived from a conjugated diene-based polymer; (b) a repeating unit derived from a (meth)acrylic acid ester-based monomer; (c) one or more repeating units selected from the group consisting of a repeating unit derived from a vinyl-based monomer, a repeating unit derived from a (meth)acrylamide-based monomer, and a repeating unit derived from a nitrile-based monomer; and (d) a repeating unit derived from an unsaturated carboxylic acid-based monomer.

The amount of the alkali metal ion included in the copolymer of the binder composition may range from 0.2 parts by weight to 5 parts by weight, in particular, 0.25 parts by weight to 3 parts by weight, with respect to 100 parts by weight of the copolymer.

The alkali metal ion is included in the copolymer included in the binder composition and thus may impart additional electrical conductivity, and, accordingly, the copolymer included in the binder composition of the present invention may have low resistance, whereby an electrode for a secondary battery, including the binder composition, may exhibit excellent performance.

When the copolymer included in the binder composition comprises the alkali metal ion in an amount of less than 0.2 parts by weight with respect to 100 parts by weight of the copolymer, an electrical resistance reduction effect due to the inclusion of the alkali metal ion is insignificant. When the copolymer included in the binder composition comprises the alkali metal ion in an amount of greater than 5 parts by weight with respect to 100 parts by weight of the copolymer, adhesion of the binder is decreased and thus lifespan characteristics of the electrode deteriorate.

The alkali metal ion may be one or more selected from the group consisting of a lithium ion, a sodium ion, a potassium ion, a rubidium ion, a cesium ion, and a francium ion and, in particular, may be a lithium ion, a sodium ion, or a potassium ion.

The alkali metal ion may be included in the copolymer during polymerization of the copolymer included in the binder, for example, by using monomers including an alkali metal salt in the copolymer polymerization process, or by adding a material including an alkali metal salt at an initial stage of the copolymer polymerization process. Alternatively, the alkali metal ion may be included in the copolymer included in the binder by preparing the copolymer and then reacting the copolymer with a hydrate of the alkali metal.

The alkali metal ion included in the copolymer may be bound to the functional group of the copolymer, or an element such as hydrogen or the like of the functional group of the copolymer may be substituted with the alkali metal ion.

The copolymer may comprise, in particular, three or more monomer-derived repeating units or polymer-derived units. The three or more monomer-derived repeating units or polymer-derived units may be three or more selected from the group consisting of: (a) a repeating unit derived from a conjugated diene-based monomer or a unit derived from a conjugated diene-based polymer; (b) a repeating unit derived from a (meth)acrylic acid ester-based monomer; (c) one or more repeating units selected from the group consisting of a repeating unit derived from a vinyl-based monomer, a repeating unit derived from a (meth)acrylamide-based monomer, and a repeating unit derived from a nitrile-based monomer; and (d) a repeating unit derived from an unsaturated carboxylic acid-based monomer.

The monomer-derived repeating units or polymer-derived units may comprise, based on the total weight (100 parts by weight) of the binder, 10 parts by weight to 97 parts by weight of the repeating unit derived from a conjugated diene-based monomer or the unit derived from a conjugated diene-based polymer (a), 1 part by weight to 49 parts by weight of the repeating unit derived from a (meth)acrylic acid ester-based monomer (b), 1 part by weight to 60 parts by weight of the one or more repeating units selected from the group consisting of a repeating unit derived from a vinyl-based monomer, a repeating unit derived from a (meth)acrylamide-based monomer, and a repeating unit derived from a nitrile-based monomer (c), and 1 part by weight to 20 parts by weight of the repeating unit derived from an unsaturated carboxylic acid-based monomer (d).

Meanwhile, the copolymer included in the binder composition may comprise two copolymers, such as a conjugated diene-based copolymer A and an acryl-based copolymer B.

When the copolymer included in the binder composition comprises both the conjugated diene-based copolymer A and the acryl-based copolymer B, enhanced adhesion may be obtained, and, accordingly, adhesion of an electrode material to an electrode current collector, adhesion between active materials, and the like are enhanced, whereby a secondary battery including the same may retain more stable electrochemical performance, resulting in enhanced performance thereof.

When the copolymer comprises the conjugated diene-based copolymer A and the acryl-based copolymer B, the conjugated diene-based copolymer A and the acryl-based copolymer B may be present in independent phases.

The independent phase refers to a state in which each copolymer is not modified when agglomerated with other copolymers or chemically reacted therewith.

The conjugated diene-based copolymer A and the acryl-based copolymer B may have elasticity such as latex and have a particle shape. Thus, the binder included in the binder composition for a secondary battery, according to an embodiment of the present invention, may be a copolymer including conjugated diene-based copolymer particles A and acryl-based copolymer particles B.

When the conjugated diene-based copolymer A has a particle shape, the conjugated diene-based copolymer particles A may have an average particle diameter of 50 nm to 300 nm. When the conjugated diene-based copolymer particles A have an average particle diameter of 50 nm to 300 nm, an electrolyte swelling phenomenon may occur less at a high temperature, a change in thickness of an electrode may be accepted due to appropriate elasticity, and a gas generation phenomenon may be decreased. When the average particle diameter of the conjugated diene-based copolymer particles A is outside the above-described range, adhesion may be deteriorated.

When the acryl-based copolymer B has a particle shape, the acryl-based copolymer particles B may have an average particle diameter of 100 nm to 700 nm. When the acryl-based copolymer particles B have an average particle diameter of 100 nm to 700 nm, adhesion of the binder may be enhanced. When the size of the acryl-based copolymer particles B is less than an appropriate range, adhesion may be reduced, and, when the size of the acryl-based copolymer particles B is greater than the appropriate range, the acryl-based copolymer particles B may itself act as resistance.

The binder composition may comprise the conjugated diene-based copolymer A and the acryl-based copolymer B in a weight ratio of 1:99 to 99:1.

When the amount of the acryl-based copolymer B is 1 part by weight or more with respect to 99 parts by weight of the conjugated diene-based copolymer A, battery resistance may be enhanced. When the amount of the acryl-based copolymer B is 99 parts by weight or less with respect to 1 part by weight of the conjugated diene-based copolymer A, occurrence of swelling at a high temperature due to affinity of the acryl-based copolymer B with a carbonate-based electrolytic solution may be appropriately inhibited, thereby preventing the binder composition from deteriorating high-temperature characteristics of a battery.

The conjugated diene-based copolymer A may comprise: (a) a repeating unit derived from a conjugated diene-based monomer or a unit derived from a conjugated diene-based polymer; (c) one or more repeating units selected from the group consisting of a repeating unit derived from a vinyl-based monomer, a repeating unit derived from a (meth)acrylamide-based monomer, and a repeating unit derived from a nitrile-based monomer; and (d) a repeating unit derived from an unsaturated carboxylic acid-based monomer.

The conjugated diene-based copolymer A may comprise, based on the total weight (100 parts by weight) of the conjugated diene-based copolymer A, 10 parts by weight to 97.9 parts by weight of the repeating unit derived from a conjugated diene-based monomer or the unit derived from a conjugated diene-based polymer (a), 1 part by weight to 60 parts by weight of the one or more repeating units selected from the group consisting of a repeating unit derived from a vinyl-based monomer, a repeating unit derived from a (meth)acrylamide-based monomer, and a repeating unit derived from a nitrile-based monomer (c), and 1 part by weight to 20 parts by weight of the repeating unit derived from an unsaturated carboxylic acid-based monomer (d).

The acryl-based copolymer B may comprise (b) a repeating unit derived from a (meth)acrylic acid ester-based monomer; (c) one or more repeating units selected from the group consisting of a repeating unit derived from a vinyl-based monomer, a repeating unit derived from a (meth)acrylamide-based monomer, and a repeating unit derived from a nitrile-based monomer; and (d) a repeating unit derived from an unsaturated carboxylic acid-based monomer.

The acryl-based copolymer B may comprise, based on the total weight (100 parts by weight) of the acryl-based copolymer B, 10 parts by weight to 97.9 parts by weight of the repeating unit derived from a (meth)acrylic acid ester-based monomer (b), 1 part by weight to 60 parts by weight of the one or more repeating units selected from the group consisting of a repeating unit derived from a vinyl-based monomer, a repeating unit derived from a (meth)acrylamide-based monomer, and a repeating unit derived from a nitrile-based monomer (c), and 1 part by weight to 20 parts by weight of the repeating unit derived from an unsaturated carboxylic acid-based monomer (d).

The conjugated diene-based monomer may be 1,3-butadiene, isoprene, chloroprene, or piperylene.

The conjugated diene-based polymer may be one or more selected from the group consisting of a polymer of two or more monomers selected from the group consisting of 1,3-butadiene, isoprene, chloroprene, and piperylene, a styrene-butadiene copolymer, an acrylonitrile-butadiene copolymer, a styrene-isoprene copolymer, acrylate-butadiene rubber, acrylonitrile-butadiene-styrene rubber, an ethylene-propylene-diene-based copolymer, and these polymers that are partially hydrogenated, epoxidized, or brominated.

The (meth)acrylic acid ester-based monomer may be one or more selected from the group consisting of methyl acrylate, ethyl acrylate, propyl acrylate, isopropyl acrylate, n-butyl acrylate, isobutyl acrylate, n-amyl acrylate, isoamyl acrylate, n-ethyl hexyl acrylate, 2-ethyl hexyl acrylate, 2-hydroxy ethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxyethyl methacrylate, hydroxypropyl methacrylate, methacryloxyethyl ethylene urea, β-carboxy ethyl acrylate, aliphatic monoacrylate, dipropylene diacrylate, ditrimethylolpropane tetraacrylate, dipentaerythritol hexaacrylate, pentaerythritol triacrylate, pentaerythritol tetraacrylate, lauryl acrylate, seryl acrylate, stearyl acrylate, lauryl methacrylate, cetyl methacrylate, and stearyl methacrylate.

In the conjugated diene-based copolymer A or the acryl-based copolymer B, other components as follows may be included.

The vinyl-based monomer may be one or more selected from the group consisting of styrene, α-methylstyrene, β-methylstyrene, p-t-butylstyrene, and divinylbenzene.

The (meth)acrylamide-based monomer may be one or more selected from the group consisting of acrylamide, n-methylol acrylamide, n-butoxy methylacrylamide, methacrylamide, n-methylol methacrylamide, and n-butoxy methylmethacrylamide.

The nitrile-based monomer may be an alkenyl cyanide, and the alkenyl cyanide may be one or more selected from the group consisting of acrylonitrile, methacrylonitrile, and allyl cyanide.

The unsaturated carboxylic acid-based monomer may be one or more selected from the group consisting of maleic acid, fumaric acid, methacrylic acid, acrylic acid, glutaric acid, itaconic acid, tetrahydrophthalic acid, crotonic acid, isocrotonic acid, and nadic acid.

Meanwhile, a copolymer of the conjugated diene-based copolymer A or the acryl-based copolymer B may be a polymerized product of a monomer containing an alkali metal ion, and the monomer containing an alkali metal ion may be configured such that the alkali metal ion is bound to the functional group of the monomer, or an element such as hydrogen or the like of the functional group of the monomer is substituted with the alkali metal ion.

The monomer containing an alkali metal ion may be an alkali metal salt of the (meth)acrylic acid ester-based monomer, or an alkali metal salt of the unsaturated carboxylic acid-based monomer, but is not particularly limited. Non-limiting examples of the monomer containing an alkali metal ion comprise lithium methacrylate, lithium acrylate, sodium methacrylate, sodium acrylate, potassium methacrylate, potassium acrylate, sodium methyl aryl sulfonate, 3-sulfopropyl acrylate potassium salt, and 3-sulfopropyl methacrylate potassium salt.

A method of preparing the conjugated diene-based copolymer A or the acryl-based copolymer B is not particularly limited, but may be prepared by, for example, suspension polymerization, emulsion polymerization, seed polymerization, or the like.

Meanwhile, the conjugated diene-based copolymer A or the acryl-based copolymer B may comprise one or more other components such as an alkali metal salt, a polymerization initiator, a crosslinking agent, a buffer, a molecular weight adjusting agent, an emulsifier, and the like according to need.

In preparation of the conjugated diene-based copolymer A or the acryl-based copolymer B, when the alkali metal salt component is not separately included, an emulsifier, an initiator, or the like in the form of an alkali metal salt may be used for the inclusion of an alkali metal ion. Alternatively, as a monomer for polymerization of the copolymer included in the conjugated diene-based copolymer A or the acryl-based copolymer B, the monomer containing an alkali metal ion may also be used. The monomer containing an alkali metal salt may be additionally used independently of an alkali metal salt-free monomer in consideration of the amount of an alkali metal of the final polymer, and may be included in an amount of 0.01 wt % to 20 wt % with respect to the total weight (100 wt %) of the polymer.

In a method of preparing the binder composition according to an embodiment of the present invention, a case in which the conjugated diene-based copolymer A and/or the acryl-based copolymer B is prepared by emulsion polymerization will be described as an example. The conjugated diene-based copolymer A and the acryl-based copolymer B, or a binder included therein are prepared by emulsion polymerization, and, when the binder has a particle shape, the particle size of the binder may be adjusted according to the amount of an emulsifier. In particular, when the amount of the emulsifier included increases, an average particle diameter of the binder particles may be decreased, and, when the amount of the emulsifier included decreases, the average particle diameter of the binder particles may be increased.

Polymerization temperature and polymerization time may be appropriately determined according to polymerization method, the type of polymerization initiator, and the like. For example, the polymerization temperature may range from 50° C. to 300° C., and the polymerization time may range from 1 hour to 20 hours, but the present invention is not limited thereto.

The polymerization initiator may be an inorganic or organic peroxide, for example, a water-soluble initiator including potassium persulfate, sodium persulfate, ammonium persulfate, or the like, or an oil-soluble initiator including cumene hydroperoxide, benzoyl peroxide, or the like. Meanwhile, to accelerate an initiation reaction of the polymerization initiator, an activating agent may be used in combination, and the activating agent may be one or more selected from the group consisting of sodium formaldehyde sulfoxylate, sodium ethylenediamine tetraacetate, ferrous sulfate, and dextrose.

The crosslinking agent may be used to accelerate crosslinking of the binder and non-limiting examples thereof comprise amines such as diethylene triamine, triethylene tetraamine, diethylaminopropylamine, xylene diamine, isophorone diamine, and the like, acid anhydrides such as dodecyl succinic anhydride, phthalic anhydride, and the like, polyamide resins, polysulfide resins, phenol resins, ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, trimethylolmethane triacrylate, and glycidyl methacrylate. Meanwhile, a grafting agent may be used in combination, and non-limiting examples thereof comprise aryl methacrylate (AMA), triaryl isocyanurate (TAIC), triaryl amine (TAA), and diaryl amine (DAA).

The buffer may be, for example, $NaHCO_3$, NaOH, or $NH_4OH$.

The molecular weight adjusting agent may be, for example, mercaptans, terpenes such as terpinolene, dipentene, t-terpinene, and the like, or halogenated hydrocarbons such as chloroform, carbon tetrachloride, and the like.

The emulsifier may be an anionic emulsifier, a non-ionic emulsifier, or both, and, when the anionic emulsifier and the non-ionic emulsifier are used together, additional stabilization in the form of a colloid through the van der Waals force of polymer particles may be provided in addition to electrostatic stabilization of the anionic emulsifier.

The anionic emulsifier may be, for example, a phosphate-based emulsifier, a carboxylate-based emulsifier, a sulfate-based emulsifier, a succinate-based emulsifier, a sulfosuccinate-based emulsifier, a sulfonate-based emulsifier, or a disulfonate-based emulsifier, but is not particularly limited. In particular, the anionic emulsifier may be sodium alkyl sulfate, sodium polyoxyethylene sulfate, sodium lauryl ether sulfate, sodium polyoxyethylene lauryl ether sulfate, sodium lauryl sulfate, sodium alkyl sulfonate, sodium alkyl ether sulfonate, sodium alkyl benzene sulfonate, sodium linear alkylbenzene sulfonate, sodium α-olefin sulfonate, sodium alcohol polyoxyethylene ether sulfonate, sodium dioctylsulfosuccinate, sodium perfluorooctanesulfonate, sodium perfluorobutanesulfonate, alkyldiphenyloxide disulfonate, sodium dioctyl sulfosuccinate, sodium alkyl-aryl phosphate, sodium alkyl ether phosphate, or sodium lauroyl sarcosinate.

The non-ionic emulsifier may be, for example, an ester-type emulsifier, an ether-type emulsifier, or an ester-ether-type emulsifier, but is not particularly limited.

In particular, the non-ionic emulsifier may be polyoxyethylene glycol, polyoxyethylene glycol methyl ether, polyoxyethylene monoallyl ether, polyoxyethylene bisphenol-A ether, polypropylene glycol, polyoxyethylene neopentyl ether, polyoxyethylene cetyl ether, polyoxyethylene lauryl ether, polyoxyethyl oleyl ether, polyoxyethylene stearyl ether, polyoxyethylene decyl ether, or polyoxyethylene octyl ether.

The binder composition may be used as a binder in the manufacture of an electrode for a secondary battery, and thus the present invention provides an electrode for a secondary battery which comprises the above-described binder composition.

The electrode for a secondary battery may be used as an electrode for a lithium secondary battery, and the lithium secondary battery may comprise a positive electrode, a negative electrode, and a separator disposed between the positive and negative electrodes.

The positive electrode may be manufactured using a method commonly known in the art. For example, the positive electrode may be manufactured by preparing a slurry by mixing a positive active material with a solvent, the above-described binder, a conductive material, and a dispersant and stirring the resulting mixture, coating a current collector made of a metal material with the slurry, and pressing and drying the resulting current collector.

The current collector is formed of a metal with high conductivity and is not particularly limited as long as it is a metal to which the positive active material slurry can be easily adhered, does not cause a chemical change in the fabricated battery within a voltage range of the battery, and has high conductivity. For example, the current collector may be formed of stainless steel, aluminum, nickel, titanium, calcined carbon, or aluminum or stainless steel that is surface-treated with carbon, nickel, titanium, silver, or the like. In addition, the current collector may have fine irregularities at a surface thereof to increase adhesion between the current collector and the positive active material. The current collector may be used in any of various forms including films, sheets, foils, nets, porous structures, foams, non-woven fabrics, and the like, and may have a thickness of 3 µm to 500 µm.

Examples of the positive active material comprise, but are not limited to, lithium cobalt oxide ($LiCoO_2$); lithium nickel oxide ($LiNiO_2$); $Li[Ni_aCo_bMn_cM^1_d]O_2$ where $M^1$ is any one selected from the group consisting of Al, Ga, and In or two or more of these elements, $0.3 \le a < 1.0$, $0 \le b \le 0.5$, $0 \le c \le 0.5$, $0 \le d \le 0.1$, and $a+b+c+d=1$; layered compounds such as $Li(Li_eM^2_{f-e-f}M^3_f)O_{2-g}A_g$ where $0 \le e \le 0.2$, $0.6 \le f \le 1$, $0 \le f' \le 0.2$, and $0 \le g \le 0.2$, $M^2$ comprises Mn and one or more selected from the group consisting of Ni, Co, Fe, Cr, V, Cu, Zn, and Ti, $M^3$ is one or more selected from the group consisting of Al, Mg, and B, and A is one or more selected from the group consisting of P, F, S, and N, or compounds substituted with one or more transition metals; lithium manganese oxides such as $Li_{1+h}Mn_{2-h}O_4$ where $0 \le h \le 0.33$, $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxides having the formula $LiNi_{1-i}M^4_iO_2$ where $M^4$ is Co, Mn, Al, Cu, Fe, Mg, B or Ga, and $0.01 \le i \le 0.3$); lithium manganese composite oxides having the formula $LiMn_{2-j}M^5_jO_2$ where $M^5$ is Co, Ni, Fe, Cr, Zn, or Ta, and $0.01 \le j \le 0.1$) or the formula $Li_2Mn_3M^6O_8$ where $M^6$ is Fe, Co, Ni, Cu, or Zn; $LiMn_2O_4$ where some of the Li atoms are substituted with alkaline earth metal ions; disulfide compounds; $LiFe_3O_4$; and $Fe_2(MoO_4)_3$.

The solvent used for fabricating the positive electrode may be an organic solvent such as N-methyl pyrrolidone (NMP), dimethyl formamide (DMF), acetone, dimethyl acetamide, or the like, water, or the like, and these solvents may be used alone or two or more of these solvents may be used in combination. The solvent may be used in a sufficient amount to dissolve and disperse the positive active material, the binder, and the conductive material in consideration of the thickness of the slurry to be applied and manufacturing yield.

The conductive material is not particularly limited so long as it does not cause chemical changes in the fabricated battery and has conductivity. Examples of conductive materials comprise, but are not limited to, graphite such as natural or artificial graphite; carbon black such as acetylene black, Ketjen black, channel black, furnace black, lamp black, and thermal black; conductive fibers such as carbon fibers and metallic fibers; conductive tubes such as carbon nanotubes; metallic powders such as carbon fluoride powder, aluminum powder, and nickel powder; conductive whiskers such as zinc oxide and potassium titanate; conductive metal oxides such as titanium oxide; and polyphenylene derivatives. The conductive material may be used in an amount of 1 wt % to 20 wt % based on the total weight of the positive electrode slurry.

The dispersant may be a water-based dispersant or an organic dispersant such as N-methyl-2-pyrrolidone or the like.

The negative electrode may be manufactured using a method commonly known in the art. For example, the negative electrode may be manufactured by preparing a negative active material slurry by mixing the negative active material with additives such as the above-described binder, a conductive material, and the like and stirring the resulting mixture, coating a negative electrode current collector with the slurry, and drying and pressing the resulting negative electrode current collector.

A solvent for fabricating the negative electrode may be an organic solvent such as N-methyl pyrrolidone (NMP), dimethyl formamide (DMF), acetone, dimethyl acetamide, or the like, water, or the like, and these solvents may be used alone or two or more of these solvents may be used in combination. The solvent may be used in a sufficient amount to dissolve and disperse the negative active material, the binder, and the conductive material in consideration of the thickness of the slurry to be applied and manufacturing yield.

The binder may be included in an amount of 10 wt % or less, in particular, 0.1 wt % to 10 wt %, with respect to the total weight of a slurry for a negative active material. When the amount of the binder is less than 0.1 wt %, effects obtained according to use of the binder are insignificant, and, when the amount of the binder is greater than 10 wt %, capacity per volume may be reduced due to a decrease in relative amount of an active material according to an increase in amount of the binder.

The conductive material is not particularly limited so long as it does not cause chemical changes in the fabricated battery and has conductivity. Examples of conductive materials comprise, but are not limited to, graphite such as natural or artificial graphite; carbon black such as acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives. The conductive material may be used in an amount of 1 wt % to 9 wt % based on the total weight of a slurry for a negative active material.

A negative electrode current collector used in the negative electrode according to an embodiment of the present invention may have a thickness of 3 m to 500 µm. The negative electrode current collector is not particularly limited so long as it does not cause chemical changes in the fabricated battery and has conductivity. For example, the negative electrode current collector may be made of copper, gold, stainless steel, aluminum, nickel, titanium, calcined carbon, copper or stainless steel surface-treated with carbon, nickel, titanium, silver, or the like, aluminum-cadmium alloys, or the like. In addition, the negative electrode current collector may have fine irregularities at a surface thereof to increase adhesion between the negative active material and the negative electrode current collector, and may be used in any of various forms including films, sheets, foils, nets, porous structures, foams, non-woven fabrics, and the like.

The active material slurry may comprise a viscosity modifier and/or a filler as necessary.

The viscosity modifier may be carboxymethylcellulose, polyacrylic acid, or the like, and the viscosity of the active material slurry may be adjusted by adding the viscosity modifier to facilitate preparation of the active material slurry and coating of the electrode current collector with the active material slurry.

The filler is an auxiliary component for inhibiting the expansion of the electrode, and is not particularly limited so long as it does not cause chemical changes in the fabricated battery and is a fibrous material. For example, the filler may be formed of an olefin-based polymer such as polyethylene, polypropylene, or the like, or a fibrous material such as glass fiber, carbon fiber, or the like.

Meanwhile, the separator may be a conventionally used general porous polymer film, for example, a porous polymer film formed of a polyolefin-based polymer, such as an ethylene homopolymer, a propylene homopolymer, an ethylene/butene copolymer, an ethylene/hexene copolymer, an ethylene/methacrylate copolymer, or the like, or a stacked structure of these porous polymer films. In addition, the separator may be a general porous non-woven fabric, for example, a non-woven fabric made of high melting point-glass fiber, polyethylene terephthalate fiber, or the like, but the present invention is not limited thereto.

A lithium salt that may be included as an electrolyte used in the present invention may be any lithium salt that is commonly used in an electrolyte for a lithium secondary battery without limitation, and the lithium salt may be, for example, any one selected from the group consisting of, as anions, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2 N^-$.

In an electrolytic solution used in the present invention, an organic solvent included in the electrolytic solution may be any organic solvent that is commonly used in an electrolytic solution for a secondary battery without limitation. As representative examples of the organic solvent, any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxy ethane, diethoxy ethane, vinylene carbonate, sulfolane, γ-butyrolactone, propylene sulfite, and tetrahydrofuran, a mixture of two or more of these materials, or the like may be used. In particular, among the carbonate-based organic solvents, ethylene carbonate and propylene carbonate, which are a type of cyclic carbonate, may be used due to high permittivity as a high-viscosity organic solvent, thus satisfactorily dissociating a lithium salt. When such a cyclic carbonate is used in combination with a low-viscosity, low-permittivity linear carbonate, such as dimethyl carbonate and diethyl carbonate, at an appropriate ratio, an electrolytic solution having high electrical conductivity may be prepared, and thus such cyclic carbonates are more preferably used.

Optionally, the electrolytic solution stored according to the present invention may further comprise additives such as an overcharge inhibitor, and the like that are included in general electrolytic solutions.

A shape of the lithium secondary battery of the present invention is not particularly limited, but may be a cylindrical shape using a can, a rectangular shape, a pouch shape, a coin shape, or the like.

The lithium secondary battery according to the present invention may be used in battery cells used as power sources of small devices, and is also preferably used as a unit battery in middle- and large-scale battery modules including a plurality of battery cells.

MODE OF THE INVENTION

Examples

Hereinafter, the present invention will be described in further detail with reference to examples and experimental examples, but these examples are not intended to limit the present invention. Examples according to the present invention may be changed in many different forms, and the scope of the present invention should not be construed as being limited to the examples described below. The examples of the present invention are provided merely to more completely explain the present invention to those of ordinary skill in the art.

Example 1

250 g of distilled water, 50 g of 1,3-butadiene, 34 g of styrene, 10 g of methylmethacrylate, 4 g of acrylic acid, 2 g of sodium acrylate, 0.4 g of sodium lauryl sulfate as an emulsifier, and 0.5 g of potassium persulfate as a polymerization initiator were put in a pressure stirrer, a reaction was initiated, and then the resulting mixture was fully stirred for 10 hours while maintained at 70° C., thereby obtaining a binder having a solid content of 40%.

Example 2

A binder having a solid content of 40% was prepared in the same manner as in Example 1, except that the same weight of acrylonitrile was used instead of styrene.

Example 3

A binder having a solid content of 40% was prepared in the same manner as in Example 1, except that the same weight of fumaric acid was used instead of acrylic acid.

Example 4

A binder having a solid content of 40% was prepared in the same manner as in Example 1, except that the same weight of acrylic acid was used instead of sodium acrylate, and, after the reaction was completed, 0.2 g of potassium hydroxide was further added, followed by stirring for 1 hour.

Example 5

A binder having a solid content of 40% was prepared in the same manner as in Example 4, except that 0.5 g of sodium hydroxide was added instead of potassium hydroxide.

Example 6

A binder having a solid content of 40% was prepared in the same manner as in Example 1, except that the same weight of lithium methacrylate was used instead of sodium acrylate.

Example 7

A binder having a solid content of 40% was prepared in the same manner as in Example 1, except that the amount of the used sodium acrylate was changed to 10 g.

Example 8

A binder having a solid content of 40% was prepared in the same manner as in Example 5, except that the amount of the added sodium hydroxide was changed to 2 g.

Example 9

250 g of distilled water, 50 g of 1,3-butadiene, 34 g of styrene, 4 g of acrylic acid, 2 g of sodium acrylate, 0.4 g of sodium lauryl sulfate as an emulsifier, and 0.5 g of potassium persulfate as a polymerization initiator were put in a pressure stirrer, a reaction was initiated, and then the resulting mixture was fully stirred for 10 hours while maintained at 70° C., thereby obtaining a copolymer A having a solid content of 40%.

Separately, 250 g of distilled water, 40 g of methylmethacrylate, 10 g of styrene, 4 g of acrylic acid, 2 g of sodium acrylate, 0.4 g of sodium lauryl sulfate as an emulsifier, and 0.5 g of potassium persulfate as a polymerization initiator were put in another pressure stirrer, a reaction was initiated, and then the resulting mixture was fully stirred for 10 hours while maintained at 70° C., thereby obtaining a copolymer B having a solid content of 40%.

80 parts by weight of the copolymer A and 20 parts by weight of the copolymer B were mixed, thereby completing the preparation of a binder.

Example 10

250 g of distilled water, 50 g of 1,3-butadiene, 34 g of styrene, 4 g of acrylic acid, 0.4 g of sodium lauryl sulfate as an emulsifier, and 0.5 g of ammonium persulfate as a polymerization initiator were put in a pressure stirrer, a reaction was initiated, and then the resulting mixture was fully stirred for 10 hours while maintained at 70° C., thereby obtaining a copolymer A having a solid content of 40%.

Separately, 250 g of distilled water, 40 g of methylmethacrylate, 10 g of styrene, 4 g of acrylic acid, 0.4 g of sodium lauryl sulfate as an emulsifier, and 0.5 g of ammonium persulfate as a polymerization initiator were put in another pressure stirrer, a reaction was initiated, and then the resulting mixture was fully stirred for 10 hours while maintained at 70° C., thereby obtaining a copolymer B having a solid content of 40%.

80 parts by weight of the copolymer A and 20 parts by weight of the copolymer B were mixed, and then 0.2 g of potassium hydroxide was further added, followed by stirring for 1 hour, thereby completing the preparation of a binder.

Comparative Example 1

A binder having a solid content of 40% was prepared in the same manner as in Example 1, except that polymerization was performed without using sodium acrylate.

Comparative Example 2

A binder having a solid content of 40% was prepared in the same manner as in Example 1, except that the amount of the added sodium acrylate was changed to 25 g.

Comparative Example 3

A binder having a solid content of 40% was prepared in the same manner as in Example 4, except that the amount of the added potassium hydroxide was changed to 8 g.

Comparative Example 4

5 g of polyacrylic acid and 0.42 g of LiOH were added to 127.5 g of deionized water and mixed, and then the resulting mixture was stirred at room temperature for 24 hours, thereby obtaining a polyacrylic acid lithium salt (weight average molecular weight: $450 \times 10^3$) having a solid content of 5% as a binder.

Comparative Example 5

250 g of distilled water, 50 g of 1,3-butadiene, 34 g of styrene, 10 g of methylmethacrylate, 4 g of acrylic acid, 0.4 g of sodium lauryl sulfate as an emulsifier, and 0.5 g of ammonium persulfate as a polymerization initiator were put in a pressure stirrer, a reaction was initiated, and then the resulting mixture was fully stirred for 10 hours while maintained at 70° C., thereby obtaining a binder having a solid content of 40%.

5 g of polyacrylic acid and 0.42 g of LiOH were added to 127.5 g of deionized water and mixed, and then the resulting mixture was stirred at room temperature for 24 hours, thereby obtaining a polyacrylic acid lithium salt (weight average molecular weight: $450 \times 10^3$) having a solid content of 5%.

The binder and the polyacrylic acid lithium salt were mixed, thereby completing the preparation of a final binder.

Example 1-1: Manufacture of Lithium Secondary Battery (Fabrication of Negative Electrode)

0.63 g of the binder prepared according to Example 1, 8 g of natural graphite, 8.3 g of a 1.2% solution (carboxymethylcellulose) as a thickening agent, and 0.1 g of carbon black as a conductive material were mixed to prepare a slurry for a negative electrode. At this time, water was subsequently added so that a content of total solids was 45 wt %. The resulting composition was coated onto Cu foil to a thickness of 250 μm by using a doctor blade, and dried in a dry oven at 80° C. for 30 minutes and then pressed to an appropriate thickness, thereby completing fabrication of a negative electrode.

(Fabrication of Positive Electrode)

96 g of $LiCoO_2$ as a positive active material, 2 g of acetylene black, and 2 g of polyvinylidene fluoride (PVdF) as a binder were added to N-methyl-2-pyrrolidone (NMP) as a solvent to prepare a slurry for a positive electrode, the slurry was coated onto Al foil to a thickness of 350 μm and dried to fabricate a positive electrode, followed by roll press, thereby completing fabrication of the positive electrode.

<Manufacture of Lithium Secondary Battery>

The manufactured negative electrode was punched to a surface area of 13.33 $cm^2$, and the manufactured positive electrode was punched to a surface area of 12.60 $cm^2$, thereby manufacturing a mono-cell. A tap was attached to an upper portion of each of the positive and negative electrodes, a separator made of a polyolefin microporous film was disposed between the negative electrode and the positive electrode, the resulting structure was placed in an Al pouch, and then 500 mg of an electrolytic solution was injected into the pouch. The electrolytic solution was prepared by dissolving 1 M $NaPF_6$ as an electrolyte in a mixed solvent of ethylene carbonate (EC): diethyl carbonate (DEC): ethyl methyl carbonate (EMC) in a volume ratio of 4:3:3.

Subsequently, the pouch was hermetically sealed using a vacuum packaging machine and maintained at room temperature for 12 hours, followed by constant current charging at a rate of about 0.05 C and constant voltage charging in which the voltage was maintained until reaching about one sixth of the current. At this time, a degassing process to remove gas generated in the cell and a resealing process were performed, thereby completing the manufacture of a sodium secondary battery.

Examples 2-1 to 10-1 and Comparative Examples 1-1 to 5-1: Manufacture of Lithium Secondary Batteries Negative electrodes were manufactured in the same manner as in Example 1-1, except that the binders prepared according to Examples 2 to 10 and Comparative Examples 1 to 5, respectively, were used instead of the binder of Example 1 used in the manufacture of the negative electrode in Example 1-1, and a lithium secondary battery was manufactured in the same manner as in Example 1-1 by using each of the manufactured negative electrodes. At this time, the positive electrode manufactured according to Example 1-1 was used.

Experimental Example 1: Measurement of Content of Alkali Metal

The content of an alkali metal in each of the binders prepared in Examples 1 to 10 and Comparative Examples 1 to 5 was measured, and results thereof are shown in Table 1 below. The content of alkali metal ions shown in Table 1 below denotes a total amount of all alkali metal ions, and was measured by ICP analysis.

TABLE 1

|  | Content of alkali metal (wt %) |
| --- | --- |
| Example 1 | 0.67 |
| Example 2 | 0.67 |
| Example 3 | 0.67 |
| Example 4 | 0.32 |
| Example 5 | 0.47 |
| Example 6 | 0.32 |
| Example 7 | 2.41 |
| Example 8 | 1.31 |
| Example 9 | 0.79 |
| Example 10 | 0.21 |
| Comparative Example 1 | 0.18 |
| Comparative Example 2 | 5.08 |
| Comparative Example 3 | 5.38 |
| Comparative Example 4 | 2.36 |
| Comparative Example 5 | 1.2 |

Experimental Example 2: Measurement of 2 C Discharge Capacity

First, a charging/discharging test was performed twice at a charge/discharge current density of 0.2 C, a charge cut-off voltage of 4.2 V (Li/Li$^+$), and a discharge cut-off voltage of 3 V (Li/Li$^+$). Subsequently, discharge capacity was measured at a charge current density of 0.2 C and a discharge current density of 2C and then was divided by the $2^{nd}$ discharge capacity to obtain a capacity ratio, which was then regarded as 2C discharge capacity (%). The results thereof are shown in Table 2 below.

Experimental Example 3: Measurement of Capacity Retention Ratio

A charging/discharging test was conducted 300 times in a 45° C. oven at a charge/discharge current density of 1 C, a charge cut-off voltage of 4.2 V (Li/Li$^+$), and a discharge cut-off voltage of 3 V (Li/Li$^+$).

All charging processes were performed at a constant current and a constant voltage, and a cut-off current of constant voltage charging was 0.05 C. After the test including a total of 300 cycles was completed, a capacity ratio ($300^{th}/1^{st}$) was obtained by dividing discharge capacity at the $300^{th}$ cycle by discharge capacity at the $1^{st}$ cycle and was regarded as a capacity retention ratio at the $300^{th}$ cycle. The results thereof are shown in Table 2 below.

TABLE 2

|  | Type of binder | 2 C discharge capacity (%) | Capacity retention ratio at $300^{th}$ cycle (%) |
| --- | --- | --- | --- |
| Example 1-1 | Example 1 | 75 | 86 |
| Example 2-1 | Example 2 | 73 | 86 |
| Example 3-1 | Example 3 | 76 | 88 |
| Example 4-1 | Example 4 | 76 | 89 |
| Example 5-1 | Example 5 | 74 | 87 |
| Example 6-1 | Example 6 | 74 | 88 |
| Example 7-1 | Example 7 | 78 | 86 |
| Example 8-1 | Example 8 | 75 | 87 |
| Example 9-1 | Example 9 | 80 | 92 |
| Example 10-1 | Example 10 | 79 | 90 |
| Comparative Example 1-1 | Comparative Example 1 | 70 | 83 |
| Comparative Example 2-1 | Comparative Example 2 | 77 | 72 |
| Comparative Example 3-1 | Comparative Example 3 | 75 | 71 |
| Comparative Example 4-1 | Comparative Example 4 | 62 | 74 |
| Comparative Example 5-1 | Comparative Example 5 | 65 | 75 |

From the results of Table 2 above, it was confirmed that the lithium secondary batteries of Examples 1-1 to 10-1 including the negative electrodes manufactured using the binders of Examples 1 to 10, respectively exhibited excellent discharge and lifespan characteristics.

In contrast, the lithium secondary battery of Comparative Example 1-1 including the negative electrode manufactured using the binder of Comparative Example 1 having a relatively small content of an alkali metal ion exhibited a lower 2C discharge capacity than that of each of the lithium secondary batteries of Examples 1-1 to 10-1, from which it was confirmed that, when the content of an alkali metal ion is relatively large, battery discharge characteristics were enhanced due to excellent resistance characteristics. However, the lithium secondary batteries of Comparative Examples 2-1 and 3-1 including the negative electrodes manufactured using the binders of Comparative Examples 2 and 3, respectively, having a content of an alkali metal ion greater than an appropriate level exhibited superior discharge characteristics, while exhibiting a lower capacity retention ratio at the $300^{th}$ cycle, when compared to the lithium secondary batteries of Examples 1-1 to 10-1, from which it was confirmed that, when the content of the alkali metal ion is greater than a certain range, an adhesive strength of the binder was decreased and thus adhesion thereof to an electrode was decreased, and thus, in particular, lifespan characteristics deteriorated.

Meanwhile, the lithium secondary batteries of Comparative Examples 4-1 and 5-1 including the negative electrodes manufactured using the binders of Comparative Examples 4 and 5, respectively exhibited lower 2C discharge capacity and a smaller capacity retention ratio at the $300^{th}$ cycle when compared to the lithium secondary batteries of Examples 1-1 to 10-1, from which it was confirmed that, although the content of the alkali metal ion is within an appropriate range, resistance characteristics and adhesion of the binder to an electrode were affected by composition of the copolymer included in the binder.

The invention claimed is:

1. A binder composition for a secondary battery comprising:
   a copolymer having a functional group; and
      an alkali metal ion bound to the functional group of the copolymer,
      wherein the alkali metal ion is included in an amount of 0.2 parts by weight to 5 parts by weight with respect to 100 parts by weight of the copolymer, and
      the copolymer comprises both a conjugated diene-based copolymer A and an acryl-based copolymer B,
   wherein the conjugated diene-based copolymer A comprises:
      (a) a repeating unit derived from a conjugated diene-based monomer or a unit derived from a conjugated diene-based polymer;
      (c) one or more repeating units selected from the group consisting of a repeating unit derived from a vinyl-based monomer, a repeating unit derived from a (meth)acrylamide-based monomer, and a repeating unit derived from a nitrile-based monomer; and
      (d) a repeating unit derived from an unsaturated carboxylic acid-based monomer; and
   wherein the acryl-based copolymer B comprises:
      (b) a repeating unit derived from a (meth)acrylic acid ester-based monomer;
      (c) one or more repeating units selected from the group consisting of a repeating unit derived from a vinyl-based monomer, a repeating unit derived from a (meth)acrylamide-based monomer, and a repeating unit derived from a nitrile-based monomer; and
      (d) a repeating unit derived from an unsaturated carboxylic acid-based monomer,
      wherein the (meth)acrylic acid ester-based monomer is one or more selected from the group consisting of methyl acrylate, ethyl acrylate, propyl acrylate, isopropyl acrylate, n-butyl acrylate, isobutyl acrylate, n-amyl acrylate, isoamyl acrylate, n-ethyl hexyl acrylate, 2-ethyl hexyl acrylate, 2-hydroxy ethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxyethyl methacrylate, hydroxypropyl methacrylate, methacryloxyethyl ethylene urea, β-carboxy ethyl acrylate, aliphatic monoacrylate, dipropylene diacrylate, ditrimethylolpropane tetraacrylate, dipentaerythritol hexaacrylate, pentaerythritol triacrylate, pentaerythritol tetraacrylate, lauryl acrylate, seryl acrylate, stearyl acrylate, lauryl methacrylate, cetyl methacrylate, and stearyl methacrylate;
      the vinyl-based monomer is one or more selected from the group consisting of α-methylstyrene, β-methylstyrene, p-t-butylstyrene, and divinylbenzene;
      the (meth)acrylamide-based monomer is one or more selected from the group consisting of acrylamide, n-methylol acrylamide, n-butoxy methylacrylamide, methacrylamide, n-methylol methacrylamide, and n-butoxy methylmethacrylamide; and
      the unsaturated carboxylic acid-based monomer is one or more selected from the group consisting of maleic acid, fumaric acid, methacrylic acid, acrylic acid, glutaric acid, itaconic acid, tetrahydrophthalic acid, crotonic acid, isocrotonic acid, and nadic acid.

2. The binder composition of claim 1, wherein the alkali metal ion comprises one or more selected from the group consisting of a lithium ion, a sodium ion, a potassium ion, a rubidium ion, a cesium ion, and a francium ion.

3. The binder composition of claim 1, wherein the binder composition comprises 1 part by weight to 30 parts by weight of the acryl-based copolymer B based on 100 parts by weight of total solids of the binder composition.

4. The binder composition of claim 1, wherein the conjugated diene-based copolymer A comprises, based on a total weight (100 parts by weight) of the conjugated diene-based copolymer A,
   10 parts by weight to 97.9 parts by weight of the repeating unit derived from a conjugated diene-based monomer or the unit derived from a conjugated diene-based polymer (a);
   1 part by weight to 60 parts by weight of the one or more repeating units selected from the group consisting of a repeating unit derived from a vinyl-based monomer, a repeating unit derived from a (meth)acrylamide-based monomer, and a repeating unit derived from a nitrile-based monomer (c); and
   1 part by weight to 20 parts by weight of the repeating unit derived from an unsaturated carboxylic acid-based monomer (d).

5. The binder composition of claim 1, wherein the acryl-based copolymer B comprises, based on a total weight (100 parts by weight) of the acryl-based copolymer B,
   10 parts by weight to 97.9 parts by weight of the repeating unit derived from a (meth)acrylic acid ester-based monomer (b);
   1 part by weight to 60 parts by weight of the one or more repeating units selected from the group consisting of a repeating unit derived from a vinyl-based monomer, a repeating unit derived from a (meth)acrylamide-based monomer, and a repeating unit derived from a nitrile-based monomer (c); and
   1 part by weight to 20 parts by weight of the repeating unit derived from an unsaturated carboxylic acid-based monomer (d).

6. The binder composition of claim 1, wherein the nitrile-based monomer is an alkenyl cyanide.

7. The binder composition of claim 6, wherein the alkenyl cyanide comprises one or more selected from the group consisting of acrylonitrile, methacrylonitrile, and allyl cyanide.

8. An electrode for a secondary battery, the electrode comprising the binder composition according to claim 1.

9. A lithium secondary battery comprising the electrode according to claim 8.

* * * * *